(12) United States Patent
Xia (10) Patent No.: US 10,064,148 B2
(45) Date of Patent: Aug. 28, 2018

(54) ULTRA-WIDE BAND POSITIONING SYSTEM

(71) Applicant: M2 Robots, Inc., Sunnyvale, CA (US)

(72) Inventor: Peiqing Xia, Sunnyvale, CA (US)

(73) Assignee: M2 Robots, Inc., Sunnyvale, CA (US)

( * ) Notice: Subject to any disclaimer, the term of this patent is extended or adjusted under 35 U.S.C. 154(b) by 0 days.

(21) Appl. No.: 15/411,813

(22) Filed: Jan. 20, 2017

(65) Prior Publication Data
US 2018/0213492 A1    Jul. 26, 2018

(51) Int. Cl.
*H04W 56/00* (2009.01)
*H04W 64/00* (2009.01)
*H04W 72/04* (2009.01)
*H04W 4/02* (2018.01)
*H04B 1/69* (2011.01)
*G01S 5/14* (2006.01)

(52) U.S. Cl.
CPC .......... *H04W 56/001* (2013.01); *G01S 5/145* (2013.01); *H04B 1/69* (2013.01); *H04W 4/026* (2013.01); *H04W 56/006* (2013.01); *H04W 56/0015* (2013.01); *H04W 64/003* (2013.01); *H04W 72/0446* (2013.01)

(58) Field of Classification Search
CPC ..... H04W 64/00; H04W 4/02; H04W 64/003; H04W 24/10; H04W 4/023; H04W 24/04; H04W 4/025; H04W 56/00; H04W 56/001; H04W 56/002; H04W 56/006; H04W 72/0446; H04W 56/0015; H04W 4/026; G01S 5/145; H04B 1/69
See application file for complete search history.

(56) References Cited

U.S. PATENT DOCUMENTS

| | | | | |
|---|---|---|---|---|
| 2002/0009168 | A1* | 1/2002 | Dick | H04B 1/7073 375/356 |
| 2008/0240072 | A1* | 10/2008 | Bykovnikov | H04B 7/269 370/350 |
| 2010/0149032 | A1* | 6/2010 | Feller | G01S 19/05 342/357.43 |
| 2014/0003416 | A1* | 1/2014 | Kim | H04W 56/00 370/350 |
| 2016/0057186 | A1* | 2/2016 | Jose | H04L 45/02 370/312 |

* cited by examiner

*Primary Examiner* — Daniel Lai
(74) *Attorney, Agent, or Firm* — Sheppard Mullin Richter & Hampton LLP (57) ABSTRACT

Embodiments provided herein are directed to an ultra-wide broadband system configured to produce positioning estimates for a user device. To ensure the high quality of this positioning service, the ultra-wide broadband system is configured to prevent signal collision, and eliminate the need for inconvenient cable connections for base station deployment. Further, the one way communication nature of the ultra-wide broadband system enables low power operation of the user device.

22 Claims, 5 Drawing Sheets

ULTRA-WIDE BAND POSITIONING SYSTEM

FIELD OF THE INVENTION

This disclosure relates generally to a positioning system, and particularly to an ultra-wide band positioning system configured to eliminate communication failure due to signal collision, as well as eliminate the need for inconvenient cable connections for base station clock synchronization. The ultra-wide band positioning system described herein significantly reduces the average power consumption compared to positioning systems requiring two-way communication.

BACKGROUND

The position/location of an object, such as a person associated with a device, may be determined using a variety of positioning systems and techniques including: global positioning system (GPS); inertial navigation system (INS); Wifi round trip time measurement, finger print matching, or angle of arrival; BLUETOOTH™ wireless signal strength, round trip measurement, or angle of arrival; earth magnetic field finger print matching, etc. Ultra-wide band (UWB) ranging has also been found to have a high accuracy among radio signal based positioning systems. UWB ranging typically involves one-way or two-way communication of signals between a reference radio placed at a known location and a target object (e.g., a user device). Conventional UWB two-way ranging architectures, however, suffer from various drawbacks. For instance, the two-way communication of signals in such UWB architectures limits the total amount of ranging/positioning requests that may be issued within a given period of time, as multiple ranging/positioning requests with the same pseudorandom code received at the same time may easily overload the system. Moreover, facilitating the positioning requests of a larger number of users results in a lower update rate in situations where the success rate of such positioning requests needs to be (or is desired to be) guaranteed. Furthermore, the one-way communication of signals in UWB architectures is often associated with communication failure due to signal collision, and the need to synchronize the base-station local time coordinate.

SUMMARY

The present disclosure describes a unique ultra-wide band positioning system that provides efficient signal communication.

Accordingly, in one embodiment, the present disclosure provides a system comprising a control station, and a plurality of base stations, where each of the base stations is disposed at a location of a space, is in electronic communication with the control station, and is configured to operate primarily in a broadcast mode. In particular, each base station is configured to broadcast ranging signals such that (a) a user device in the space is able to receive the ranging signals of at least one of the base stations one at a time and is able to determine a location of the user device based on the received ranging signals, and (b) if ranging signals from more than one base station are received by the user device, no signal collision occurs. Additionally, the control station is configured to receive one or more of the ranging signals from each of the base stations and determine whether time synchronization is needed for any of the base stations.

In one embodiment, the present disclosure provides a system comprising a control station and a plurality of base stations, where each of the base stations is disposed at a location of a space, in electronic communication with the control station, and is configured to operate primarily in a receiver mode. In particular, each of the base stations is configured to receive ranging signals from a user device in the space, and calculate a pseudorange between the user device and the base station based on the received ranging signals. Moreover, the control unit is configured to receive the calculated pseudoranges from the plurality of base stations, and determine a location of the user device in the space based on the calculated pseudoranges.

BRIEF DESCRIPTION OF THE DRAWINGS

Certain features of various embodiments of the present technology are set forth with in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Ultra-Wide Band Positioning Systems

Presently, ultra-wide band (UWB) ranging provides the highest ranging accuracy among all radio signal based positioning systems. UWB ranging is typically implemented using two-way communication between base stations deployed at known locations and user devices. The two-way communication implementation limits the total capacity of ranging requests within a given period of time. Therefore, a larger number of users comes at the price of a lower update rate, especially where one needs to ensure that the positioning requests have certain success rates. In particular, when multiple positioning requests with the same pseudorandom code are received at the same time, it may easily overload the UWB receiver.

In one implementation of the present technology, all the base stations may operate in broadcast mode, and user devices located within a certain proximity to one or more of the base stations can only listen to the broadcast radio signals transmitted therefrom. Since the user devices are passive, there is no limit on the total number of user devices allowed. As used herein, a "user device" refers to an electronic device that uses information received at various sources to determine its own location, and hence the location of any entity associated with the user device. The location can be an absolute location (e.g., relative to an earth coordinate), or a relative location (e.g., in a user defined coordinate). A "base station" in this context, refers to an electronic device that is configured to transmit (or broadcast) a signal to be received at a user device (and/or other devices), allowing the user device to use the signal to determine the user device's range from each base station, then determine the user device's location. It is noted, however, that the passive receiving mode of the user device does not necessarily mean that the user device cannot or should not transmit signals. For instance, the user device may send information to a control station or even to one or more of the base stations.

Another advantage of utilizing the base stations in broadcast mode is the possibility of increasing the transmitting power of the base stations when the link budget becomes insufficient. Such capability is useful in emergency situations, for instance, when base station deployment is not available in a desired location (e.g., in a building with no base station infrastructure pre-deployed, and the concrete building material serves as a good RF signal attenuator), or when certain emergency positioning requests do not allow the time to build the base-station infrastructure, such as in cases associated with fire-fighting.

Base stations may be deployed at known locations, or locations which may be determined on the fly. The base stations are configured to broadcast signals (referred to herein as "ranging signals") that include communication preambles and payloads. When a device receives a ranging signal, the device may decode the preambles and payloads for various uses.

Multiple ranging signals received at the same time by the same device may cause collision and lead to communication failure. Accordingly, in one embodiment, the base stations are configured to transmit signals during their designated time slots, or using a different modulation scheme, or a different frequency to avoid such communication failure. As used herein, the term "slot" refers to one or more of time slot, modulation scheme, frequency, and antenna coverage area for signal transmission.

In some embodiments, if two or more base stations are deployed at locations separated sufficiently far apart such that a user device can only receive the signals transmitted from one of the base stations at a usable signal level (e.g., other signals transmitted from the other base stations are so low that it won't significantly reduce the total signal/noise ratio of the signals received at the usable signal level), then the two or more base stations may be allowed to share the same slot for signal transmission. By condensing the total time allocated to broadcasting base station signals, more time may be available to user specific communication between the infrastructure (e.g., base station, control station, etc.) and user device(s).

In some implementations, each base station may run according to its own local clock. Over time, the transmission time from each base station may drift away from each other. To this end, a method is provided to correct/synchronize the local clocks of the base stations when needed. For instance, in one embodiment, the signals from the base stations may also be received at a Ground Control Station ("GCS" or "control station") which may be equipped with a monitoring receiver. The control station may be configured to determine the local clock timestamp when it receives the transmission from the base station. The bias of each base station relative to the control station's clock is then estimated based on the signal reception timing information. The control station may additionally be configured to send a signal comprising synchronization information to each base station so as to synchronize the clocks of each base station to a common timing reference (i.e., the clock of the control station).

In some implementations, the user devices use ephemeris information encoded in the ranging signals from the base stations for determining the pseudorange between each such base station and user device. Each user device may utilize respective pseudorange measurements, and preferably at least four pseudorange measurements, to determine the location of the user device.

In some embodiments, the user devices are configured to function in broadcast mode, and thus configured to transmit ranging signals to the base stations. In such embodiments, each base station that receives ranging signals from user devices in proximity thereto may use information encoded in said signals for calculating the pseudoranges between the respective base station and the user devices. Each base station may transmit the calculated pseudorange measurements to the aforementioned control station. The control station may utilize the pseudorange measurements, and preferably at least four pseudorange measurements, to determine the location of the user device. The control station may also provide the determined user device location to the user device.

In embodiments in which the user devices are configured to function in broadcast mode, the local clocks of the base stations may be synchronized according to various approaches. For instance, in one approach, the control station may transmit, at a predetermined interval, a synchronization signal to the base stations. In another approach, all the base stations may be driven the same clock distribution network, where all the base station time coordinates are coherent.

Figure 1:
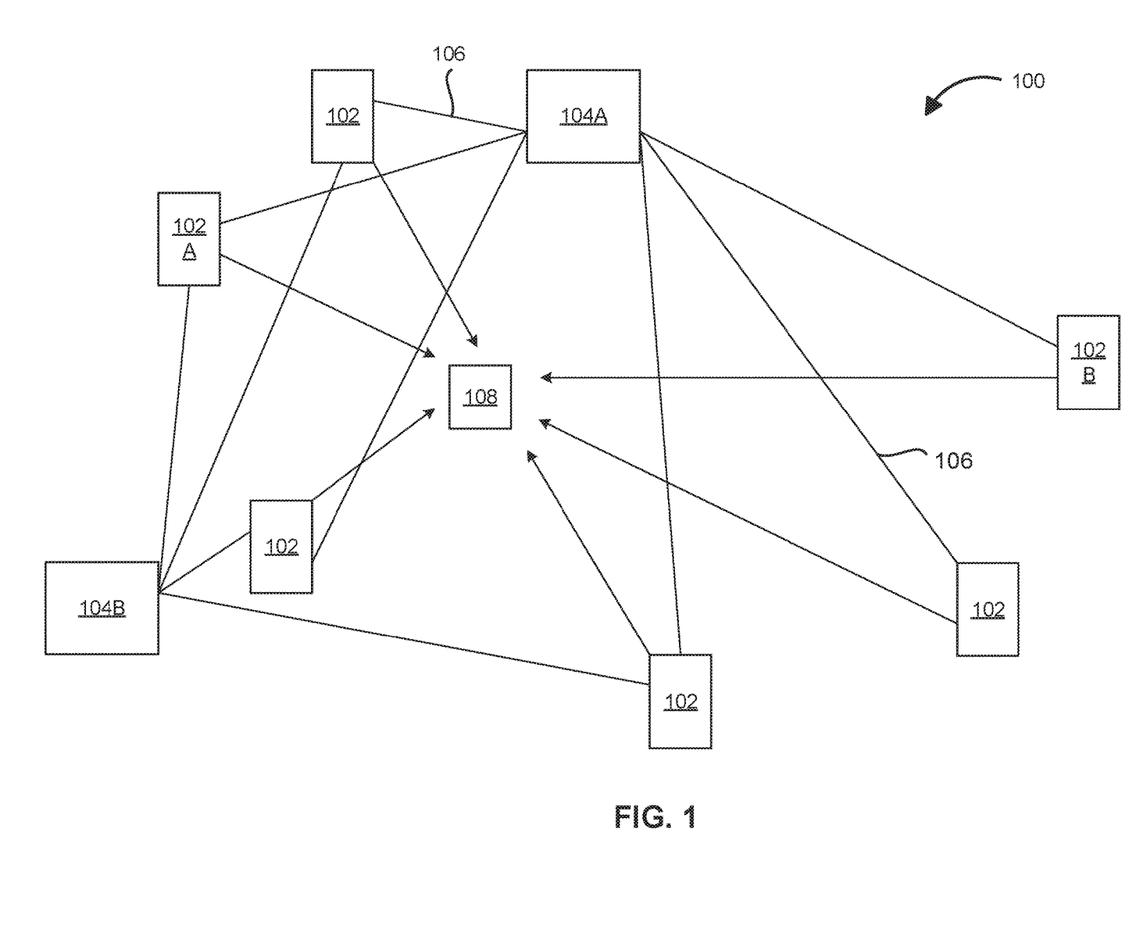
FIG. 1 depicts a simplified schematic of one arbitrarily chosen segment of a complete ultra-wide broadband (UWB) positioning system, according to one embodiment.

Referring now to FIG. 1, an exemplary ultra-wide band (UWB) positioning system 100 is depicted in accordance with one embodiment. The UWB positioning system 100 may be implemented in combination with other devices/features/components described herein, such as those described with reference to other embodiments and FIGS. The UWB positioning system 100 may also be used in various applications and/or in permutations, which may or may not be noted in the illustrative embodiments/aspects described herein. For instance, the UWB positioning system 100 may include more or less features/components than those shown in FIG. 1, in some embodiments. Indeed, the UWB positioning system 100 is not limited to the quantity or arrangement of the base stations 102, the control units 104A, 104B, and the user device 108 shown FIG. 1.

As shown in FIG. 1, the UWB positioning system 100 comprises a plurality of base stations 102 and at least one control station 104A operatively coupled via a network 106. The control station 104A and each base station 102 is located at a known position, which may be determined by a global positioning system (GPS), local survey data, computer vision based locationing, or other positioning/mapping system as would be understood by skilled artisans upon reading the present disclosure. The UWB positioning system 100 also includes at least one user device 108, the location of which is unknown and to be determined.

Each base station 102 is configured to transmit a ranging signal (e.g., a UWB ranging signal) repeated at a predetermined interval. The ranging signals each comprise a preamble/header, as well as a data payload encoding synchronization information (also referred to herein as ephemeris information). As discussed in greater detail below, the synchronization information encoded in the data payload of a ranging signal may include the time bias compensation information of transmission of said ranging signal, the known position of the base station 102 from which the ranging signal was transmitted if such information is not a priori known to the user device, etc.

The distance between a base station 102 and the user device 108 may be determined from the time-of-flight of a ranging signal transmitted from the base station 102 to the user device 108. Provided the link budget from the base station 102 allows the user device 108 to decode the preamble/header and data payload of the transmitted ranging signal, the time of flight of the ranging signal may be calculated based, at least in part, on the synchronization information encoded therein. The determination of the distance between a base station 102 and a user device 108 may be referred to herein as a "pseudorange measurement." The particular 3-dimensional position of the user device 108 may be determined based on at least four pseudorange measurements, i.e., based on the calculated distance between the user device 108 and at least four separate base stations 102. As for the case involving a 2-dimensional plane, or in more general form, a surface that is not necessarily flat, the particular position of the user device 108 may be determined based on at least three pseudorange measurements. For a 1-dimensional case, such as for a railway, at least two pseudorange measurements are needed for location determination.

One advantage associated with the novel UWB positioning system 100 described herein is the ability to prevent signal collision of the ranging signals transmitted from the ranging stations 102. Prevention of signal collision may be achieved, for example, based on the transmission slot and/or rate of the ranging signals emitted from the base stations 102 and/or the known positions of the base stations 102 relative to one another. For instance, in some embodiments, each base station 102 may be synchronized to a common timing reference, and assigned a unique slot during which its respective ranging signal may be transmitted. The unique slot assigned to each base station 102 for ranging signal transmission may be determined by the control station 104A. Moreover, the common timing reference may correspond to the clock of the control station 104A.

In some embodiments, more than one base station 102 may be assigned the same slot provided the at least two base stations 102 are a predetermined distance apart. This predetermined distance between base stations 102 corresponds to a distance at which the user device 108 can only receive the ranging signals transmitted from a first of the base stations 102 at a usable signal level, where the ranging signals transmitted from a second of the base stations 102 are of such a low level as to not significantly affect the total signal-to-noise (S/N) ratio of the ranging signals transmitted from the first of the base stations 102. For example, base stations 102A and 102B may transmit ranging signals "A" and "B", respectively, during the same slot. However, base stations 102A and 102B may be located sufficiently far apart such that when the user device 108 is within range of base station 102A to receive ranging signal "A" at a usable signal level, the signal strength of ranging signal "B" is too low to affect the total S/N of ranging signal "A."

By focusing the total time allocated to the broadcasting of ranging signals from the base stations 102, more time is available to user specific communication between the user device 108 and the infrastructure of the UWB positioning system 100.

Another advantage of the novel UWB positioning system 100 described herein is the ability of the base stations 102 to adjust the transmission timing of the ranging signals to further ensure the prevention of signal collisions. While each base station 102 runs according to its own clock and may be synchronized to a common timing reference, the clock of each base station 102 may nonetheless drift from that of the common timing reference over time. Accordingly, in some embodiments, each base station 102 may be configured to receive a clock adjustment command and adjust the transmission of its respective ranging signal based on the received command. This clock adjustment command may, for example, comprise instructions for adjusting the predetermined interval at which ranging signals are transmitted from a base station 102, which in turn ensures that each ranging signal is transmitted during the unique time slot assigned to the base station 102.

Another advantage of the novel UWB positioning system 100 described herein is the significant reduction of average power consumption. Since the signal transmission from the base-station is a pre-scheduled series of events, such schedule may correspond to a priori known information for any unit in the system 100. As an example, consider user device 108, which is often battery powered, and for which the power consumption plays an important role in the user experience. The user device 108 may not need to operate at the maximum possible position update rate. In many user application scenarios, this may only be required when the user manually requests the user device to do so, hence it may happen at a very low rate. When signal reception is needed, the user device 108 only need to run the whole receiving data processing chain in a predictable period of time, centered at the next scheduled base station transmission moment, plus and minus the uncertainty in timing keeping and signal propagation time variation. For the rest of the operation phase, the user device 108 may run the time-keeping clock sector only, leaving all the remaining power consuming hardware sectors turned off. On average, the duty cycle mode operation greatly reduces the total power consumption. The same power saving scheme applies to the base station 104A if power consumption is a valid concern.

Embodiments in which the position of the user device 108 is determined based on the receipt of ranging signals from one or more base stations 102 may be characterized as instances in which the user device operates in "receiver mode." In further embodiments, the position of the user device 108 may be determined where the role of transmission and reception associated with the base stations 102 and the user device 108 reversed. Such a reversal of roles may be characterized as instances in which the user device operates in "broadcast mode," and is configured to transmit (broadcast) a ranging signal to the base stations 102. A base station 102, upon receipt of such a ranging signal transmitted from the user device 108, may determine the pseudorange therebetween based on the time-of-flight of the ranging signal, and transmit the determined pseudorange to the control station 104A. The control station 104A may then determine the 3-dimensional location of the user device 108 once pseudorange measurements from at least four base stations 102 have been collected. The determined user device location may then be transmitted from the control station to the user device.

A. User Device—Receiver Mode

As indicated above, the base stations 102 are configured to transmit ranging signals (e.g. UWB signals) repeated at predetermined intervals. Such ranging signals may be received at the control station 104A. Upon receipt of such ranging signals, the control station 104A may be configured to model the clock synchronization error of the base stations 102 to a common timing reference, e.g., to the clock of the control station 104A. For instance, the control station 104A may be configured to estimate synchronization/ephemeris information for each base station that describes the clock offset between a respective base station 102 and the control station 104A. The control station may then provide each base station 102 with its respective synchronization/ephemeris information. After provision of the synchronization/ephemeris information, subsequent ranging signals transmitted from each base station 102 may include the synchronization/ephemeris information associated therewith. The user device 108, upon receipt of a ranging signal from a base station 102, may utilize said synchronization/ephemeris information in calculating the pseudorange between the base station 102 and the user device 108.

As also indicated above, the control station 104A is further configured to assign each base station 102 a unique slot for the transmission of a ranging signal to prevent signal collision amongst the multiple base stations 102.

The control station 104A may also be configured to update the synchronization/ephemeris information associated with each base station 102 to reflect any changes in the clock offset between the base station 102 and the control station 104A. Such updated synchronization information may be provided to the respective base station 102, so that subsequent ranging signals transmitted therefrom include the updated synchronization/ephemeris information. Moreover, the control station 104A may be configured to adjust the transmission timing of ranging signals from a base station 102, e.g., by sending a command thereto, so as to ensure that the ranging signals are transmitted from the base station 102 during the unique slot assigned thereof.

As indicated previously, one benefit of the user device 108 operating in "receiver mode" in which the user device 108 is configured to receive ranging signals from the base stations 102, is that there is no limit to the total number of user devices 108 that may use the UWB positioning system 100 to determine their respective locations. It is of note that the user device 108 when operating in "receiver mode" is not prohibited from transmitting a signal, such as a UWB signal, to send information to the infrastructure of the system 100, or from receiving a user specific communication message (e.g., in the form of a UWB signal) from said infrastructure.

As also indicated previously, another benefit of the user device 108 operating in "receiver mode" is the ability to increase the transmission power of the ranging signals when the link budget associated with a base station 102 becomes insufficient. Such capability is useful in emergency situations where deployment of the base stations 102 is not available in a desired location, for example in a building in which there is no base station 102 infrastructure pre-deployed, and the building material (e.g., concrete) serves as a good RF signal attenuator. As is frequently the case, emergency situations, such as structure fires, do not allow for time in which to build the base station infrastructure, thus the ability to increase ranging signal transmission power is particularly advantageous.

Exemplary descriptions concerning the functional relationships between the base stations 102, the control station 104A, and the user device 108 as operating in "receiver mode" are provided below.

Ranging Signal Propagation Delay Between Base Station and User Device

Each base station 102 runs according to its own local timing system, denoted herein as $t_P$. For purposes of illustration, consider one arbitrary base station 102, e.g., base station 102A and its local time coordinate, $t_{P4}$. Base station 102A is powered on at time zero in $t_{P4}$, after which an initialization time elapses denoted $t_{P4S}|t_{P4}$. It is important to note that as used herein, the general expression "A|B" describes the time at which event "A" occurs as measured in time system "B."

After initialization, base station 102A transmits a ranging signal repeated at a predetermined interval R measured in $t_{P4}$, where said ranging signal comprises synchronization information associated with base station 102A. The transmission time of each ranging signal as measured in the local time system ($t_{P4}$) of base station 102A is $t_{P4}(k)|t_{P4}$, where k is the index of the transmission sequence number.

To prevent signal collision, each base station 102 is assigned, e.g., by the control station 104A, a unique slot during which a ranging signal may be transmitted. For base station 102A, the time slot attribute of the slot definition assigned thereto is designated $T_{P4L}|t_{P4}$. Additionally, each base station 102 may be synchronized to a common timing reference (e.g., to the clock of the control station 104A). Accordingly, the ranging signals transmitted from each base station 102 may include information describing the calculated clock bias/adjustment model between the base station 102 and the control station 104A. In some embodiments, the control station 104A may calculate this clock bias and communicate the calculated clock bias to the respective base station 102. With respect to each base station 102A, when the time coordinate of $t_{P4}$ drifts too far from the common time base, certain clock adjustment determined by the control station needs to be applied by the base station, denoted as $t_{P4A}|t_{P4}$. This guarantees no slot collision happens.

Further, the ranging signals may include thermal noise associated with the base station 102 from which it was transmitted. The thermal noise associated with base station 102A is denoted as $u_{P4}(k)$.

In view of the above, the transmission time of the $k^{th}$ ranging signal from base station 102A, as measured in the local time system of base station 102A, is represented by Equation (1):

$$t_{PA}(k)|t_{PA} = t_{PAS}|t_{PA} + kR|t_{PA} + T_{PAL}|t_{PA}t_{PA\Delta}|t_{PA}u_{PA}(k) \quad (1).$$

In some embodiments, ranging signals transmitted from each base station 102 may propagate to the control station 104A. As noted previously, the local time system, $t_g$, of the control station 104A, is preferably used as the system time to coordinate all base stations 102.

The transmission time, $t_{PA}(k)|t_g$, of the ranging signal transmitted from base station 102A as measured in the local time system, $t_g$, of the control station 104A is represented by Equation (2):

$$t_{PA}(k)|t_g = \quad (2)$$
$$kR|t_{PA} + \left\{ \sum_{i=0}^{N} C_{gAi} \cdot [(k - TOA(k))R|t_{PA}]^i + G_{\alpha\beta}|t_g + e_{gA}(k) \right\},$$

with the variables included therein described below.

The term $C_{gAi}$ is the $i^{th}$ order clock polynomial error coefficient for base station 102A, which may be estimated/calculated by the control station 104A. As discussed in greater detail below, the $C_{gAi}$ coefficients incorporated in the ranging signals may be utilized by the user device 108 upon receipt thereof to predict the clock bias of base station 102A relative to the common timing reference (e.g., the clock of the control station 104A). It is important to note that the polynomial fitting result ($C_{gAi}$) corresponds to an approximation of the actual clock drift of base station 102A over a given time period. However, as the clock drift of base station 102A relative to the common timing reference may change over time, the $C_{gAi}$ coefficients (e.g., the set of synchronization/ephemeris information) needs to be updated at predetermined times (e.g., at predetermined time intervals, periodically, at a threshold violation of time bias compensation residual, etc.), and provided to the user device 108 via the ranging signals. Each set of $C_{gAi}$ coefficients is associated with the term TOA(k), which describes the beginning sequence number from which the set of synchronization/ephemeris information embedded in the $k^{th}$ ranging signal is valid. TOA(k) is thus a constant, unique value for each set of synchronization/ephemeris information (e.g., for each set of $C_{gAi}$ coefficients).

If only one control station 104A is present in the system 100, the term $G_{\alpha\beta}|t_g$ is simply a constant value 0. The sole purpose of introducing the term $G_{\alpha\beta}|t_g$ is to allow the control station 104A to freely adjusting the value $C_{gA0}$. A non-zero value is used when the system consists of more than one control station, the details of which are provided in a forthcoming section describing a larger scale network.

The term $e_{gA}(k)$ is the polynomial fitting error of the clock drift of base station 102A relative to the control station 104A, and may be estimated/calculated by the control station 104A. In addition, the thermal noise associated with the control station 104A is aggregated in $e_{gA}(k)$.

In some embodiments, the control station 104A RF chain has a total delay $B_g|t_g$, which may be approximated as a constant for ranging signals received from all base-stations 102, ignoring the delay difference due to different signal impinging angles caused by antenna group delay difference. The term $B_g|t_g$ is not included in Equation 2 due its lack of observability and inability to be separated from the term $C_{gA0}$ in the clock bias estimate process. In embodiments in which this residual error is considered, the antenna group delay pattern at all signal impinging angles are pre-calibrated, the details of which are discussed in a later section herein.

The propagation time, $\tau_g$, of each ranging signal from a base station 102 to the control station 104A is measured in the local time system of control station denoted $t_g$. Given that the base stations 102 are deployed at known locations, the propagation distance, and hence the propagation delay time, $\tau_{gA}(k)|T_g$, from base station 102A to the control station 104A is known and represented by Equation 3:

$$\tau_{gA}(k)|t_g = t_{gA}(k)|t_g - t_{PA}(k)|t_g \quad (3).$$

Utilizing the relationship expressed in Equations (2) and (3), the reception time, $t_{gA}(k)|t_g$, at the control station 104A for the signal transmitted at $t_{PA}(k)|t_{PA}$, as measured in the local time system of the control station 104A, is represented by Equation (4):

$$t_{gA}(k)|t_g = \tau_{gA}(k)| \quad (4)$$
$$t_g + \left\{ \sum_{i=0}^{N} C_{gAi} \cdot [(k - TOA(k))R|t_{PA}]^i + G_{\alpha\beta}|t_g + e_{gA}(k) \right\} + kR|t_{PA}.$$

While the base stations 102 are synchronized to the timing system of the control station 104A, the user device 108 runs according to its own timing system, which is completely independent from that of the control station 104A. The clock bias between the user device 108 and the control station 104A is the same for all base station 102 signal reception, and is estimated as an unknown in the navigation solution (i.e., in determining the location of the user device 108). The timing system, $t_r$, of the user device 108 may be represented by Equation (5):

$$t_r = t_g + T_{gr} + e_r(k) \quad (5)$$

where $t_g$ is the timing system of the control station 104A; $T_{gr}$ is the instantaneous time difference between $t_r$ and $t_g$; and $e_r(k)$ is the integrated clock rate drift within the user device signal reception time spreading period, $T_S$, from the first to the last reception of the ranging signals at the user device 108. Given that the UWB positioning system 100 is preferably used in a local environment, the maximum possible reception time spreading period, $T_S$, over which all base station 102 transmitted ranging signals are received by the user device 108 is small enough for the clock rate drift to be ignored ($e_r(k) \approx 0$).

The $k^{th}$ transmission of a ranging signal from base station 102A arrives at the user device 108 at time $t_{rA}(k)|t_r$, as measured in the local time coordinate of the user device 108, $t_r$. This arrival time of the ranging signal at the user device 108 is represented by Equation (6):

$$t_{rA}(k)|t_r = t_{PA}(k)|t_r + \tau_{rA}(k)|t_r + B_{rA}|t_r + u_{rA}(k) \quad (6).$$

Utilizing the expression for $t_r$ as defined in Equation (5), enables Equation (6) to be rewritten as Equation (7):

$$t_{rA}(k)|t_r = t_{PA}(k)|t_g + T_{gr} + e_r(k) + \tau_{rA}(k)|t_r + B_{rA}|t_r + u_{rA}(k) \quad (7).$$

Further utilizing the expression for $t_{PA}(k)|t_g$ as defined in Equation (2), Equation (7) may be rewritten as Equation (8):

$$t_{rA}(k)|t_r = \qquad (8)$$
$$kR|t_{PA} + \left\{\sum_{i=0}^{N} C_{gAi} \cdot [(k-TOA(k))R|t_{PA}]^i + G_{\alpha\beta}|t_g + e_{gA}(k)\right\} +$$
$$T_{gr} + e_r(k) + \tau_{rA}(k)|t_r + B_{rA}|t_r + u_{rA}(k),$$

with the variables therein described below.

$B_{rA}|t_r$ is the extra delay caused by the user device 108 RF chain for its signal reception from base station 102A. Assuming that the ranging signals from all base stations 102 are chosen to be of the same center frequency, said ranging signals will all have the same RF channel total propagation delay, ignoring the delay difference from different signal impinging angles. The term $B_{rA}|t_r$ can be thus be simplified as $B_r|t_r$, which is a constant value for all ranging signal measurements, and may be calibrated online or offline. An exemplary calibration method is described in greater detail below. When such assumptions are not valid, a later RF group delay calibration method may be needed, the details of which are discussed in greater detail below.

The term $u_{rA}(k)$ corresponds to the additive white Gaussian noise (AWGN) associated with the user device 108.

Reorganizing Equation (8) yields the propagation delay $\tau_{rA}(k)|t_r$ of the ranging signal from base station 102A to the user device 108, as measured in the local timing system, $t_r$, of the user device:

$$\tau_{rA}(k)|t_r = t_{rA}(k)|t_r - kR|t_{PA} - \qquad (9)$$
$$\left\{\sum_{i=0}^{N} C_{gAi} \cdot [(k-TOA(k))R|t_{PA}]^i + G_{\alpha\beta}|t_g + e_{gA}(k)\right\} -$$
$$e_r(k) - (T_{gr} + B_r|t_r) - u_{rA}(k)$$

In the above pseudorange Equation (9), $t_{rA}(k)|t_r$ is the measurement of the time of arrival of the ranging signal by the user device 108; $kR|t_{PA}$ is derived from the transmission sequence number encoded in the data payload of the ranging signal; $C_{gAi}$ is delivered from the control station 104A to the user device 108 via the synchronization/ephemeris information encoded in the data payload of the ranging signal or any other digital data communication channel; and $e_{gA}(k)$ and $e_r(k)$ are clock drift terms.

Ephemeris Estimation

Equation 4 can be reorganized as follows:

$$\sum_{i=0}^{N} C_{gAi} \cdot [(k-TOA(k))R|t_{PA}]^i = \qquad (4-1)$$
$$t_{gA}(k)|t_g - \tau_{gA}(k)|t_g - kR|t_{PA} - G_{\alpha\beta}|t_g - e_{gA}(k)$$

The coefficients of the clock bias polynomial, $C_{gAi}$, may be estimated/calculated using a least square estimate or any optimal estimation method as would be understood by skilled artisans upon reading the present disclosure. In some embodiments, the past transmissions received from base station 102A may be used, e.g., by the control station 104A, to estimate the set of $C_{gAi}$ coefficients for future base station 102A transmissions. In some embodiments, a fixed or adaptive ratio of epoch number from the past to estimate $C_{gAi}$ and epoch number applying $C_{gAi}$ in the future may be used depending on the base station oscillator clock quality.

Larger Scale Network

In any network, at least one control station (e.g., control station 104A in FIG. 1) may be present. In a larger scale network, more than one control station may be needed. For instance, as shown in FIG. 1, control station 104B may also be present to cover a larger physical size of the operational area, as it cannot be guaranteed that a single control station has direct line of sight visibility to all the base stations 102. The additional control station 104B may be surrounded by its neighboring base stations 102, which may be serving other user devices 108 in their operation range. It is again important to note that the quantity and location of the base stations 102 and control stations 104 are arbitrary, and does not limit the invention in any way.

The time synchronization between control stations 104A and 104B may be realized in different approaches depending on the user application scenarios. For example, control stations 104A and 104B may be synchronized via a wired connection, or an easier to deploy, and more convenient, wireless time transfer option as is described in FIG. 1.

With the introduction of control station 104B, there is now more than one control station time coordinates. For the position determination task (e.g., determining the position of at least one user device 108), it is assumed that all base station 102 local clock times are synchronized after the ephemeris is applied to the measurement timestamp. If more than one control station time coordinates exist, when the ranging measurements come from a different time coordinate, the abovementioned assumption is no longer valid, thereby providing an erroneous positioning result.

Accordingly, in a large scale network with more than one control station, the set of base stations 102 mutually visible from the two neighboring control stations 104A and 104B is defined as Set $S_{\alpha\beta}$, whose ephemeris information is produced by control station 104A. The set of base stations 102 visible from control station 104A, but not visible from/ignored by control station 104B, is defined as Set $S_\alpha$. Similarly, the set of base stations 102 visible from control station 104B, but not visible from/ignored by control station 104A, is defined as Set $S_\beta$.

Equation (4) may be written as Equation (4A) and Equation (4B), for control stations 104A and 104B, respectively.

$$t_{g\alpha A}(k)|t_{g\alpha} = \tau_{g\alpha A}(k)|t_{g\alpha} + \qquad (4A)$$
$$\left\{\sum_{i=0}^{N} C_{g\alpha Ai} \cdot [(k-TOA(k))R|t_{PA}]^i + G_{\alpha\alpha}|t_{g\alpha} + e_{g\alpha A}(k)\right\} +$$
$$kR|t_{PA}$$

$$t_{g\beta A}(k)|t_{g\beta} = \tau_{g\beta A}(k)|t_{g\beta} + \qquad (4B)$$
$$\left\{\sum_{i=0}^{N} C_{g\beta Ai} \cdot [(k-TOA(k))R|t_{PA}]^i + G_{\alpha\beta}|t_{g\beta} + e_{g\beta A}(k)\right\} +$$
$$kR|t_{PA}.$$

The expression $g\alpha$ or $g\beta$ in Equation (4A) and (4B) indicate that the corresponding component is associated with control station 104A and 104B, respectively. In this scenario, the $G_{\alpha\beta}|t_g$ term is no longer constant (zero) as in the case of a single control station network.

One base station 102 can only accept the ephemeris estimate uploaded from one control station, and disseminate this information to the user device 108. Assume base station 102A is an element in the Set $S_{\alpha\beta}$. The local time of control station 104A is thus the reference, and the $G_{\alpha\alpha}|t_{g\alpha}$ term is constant (zero). The system time $t_{g\alpha}$ associated with control station 104A needs to be adopted by control station 104B. However, the control station 104B has its own time coordinate $t_{g\beta}$, running completely independent from $t_{g\alpha}$. The control station parameter $G_{\alpha\beta}|t_{g\beta}$ may thus be utilized to achieve synchronization between these two time coordinates.

Equation (4B) defines a set of ephemeris estimates, $C_{g\beta Ai}$, produced by control station 104B, and which is completely independent of the set of ephemeris estimates, $C_{g\alpha Ai}$, in Equation (4A), produced by control station 104A. The appropriate value of $G_{\alpha\beta}|t_{g\beta}$ needs to be used to allow the user device 108 to process measurements from a mixture of both Set $S_{ab}$ and Set $S_b$ for its positioning determination task:

$$G_{\alpha\beta}|t_{g\beta} = \sum_{i=0}^{N} (C_{g\alpha Ai} - C_{g\beta Ai}) \cdot [(k - TOA(k))R|t_{PA}]^i. \quad (10)$$

The ephemeris updated from control station 104B to the base-stations in Set $S_\beta$ is:

$$\sum_{i=0}^{N} C_{g\beta Ai} \cdot [(k - TOA(k))R|t_{PA}]^i + G_{\alpha\beta}|t_{g\beta}. \quad (11)$$

Hence the system time in control station 104A is smoothly transferred to control station 104B.

If more than one base station 102 from the Set $S_{\alpha\beta}$ are used in the above-mentioned time transfer, the weighted average of the system clock difference estimate $G_{\alpha\beta}|t_{g\beta}$ in Equation (11) is used as the optimal estimate of $G_{\alpha\beta}|t_{g\beta}$.

Two exceptional scenarios may exist in the large scale time transferring scheme. The first exception is where there is an empty Set $S_{\alpha\beta}$. It is infeasible and unnecessary to transfer time from control station 104A to control station 104B because the user device 108 will not receive base station transmission from different system time coordinates at any given time.

The second exception for a large network is where the system time transfer happens from control station 104A to control station 104B, from control station 104B to control station 104C, and so on. When the time transfer loop gets back to the origin, which corresponds to control station 104A, the timing of control station 104A compared to itself should yield zero time difference. However, each time transfer estimate between control stations introduces timing error, denoted as $\varepsilon_i$, for the $i^{th}$ hop. Assuming it takes H hops to loopback to control station 104A, the following inequality results:

$$\sum_{i=1}^{H} \varepsilon_i \neq 0$$

Accordingly, what is needed is to spread out the error, make adjustments in each $G_{\alpha\beta}|t_{g\beta}$, and approximate the relationship:

$$\sum_{i=1}^{H} \varepsilon_i = 0.$$

Synchronization/Ephemeris Information Delivery

The user device 108 needs synchronization/ephemeris information for all base stations 102 involved in the determination of the position of the user device 108. The delivery of the synchronization/ephemeris information occurs over a time period proportional to the bit length of the ephemeris dataset. Less ephemeris content being transmitted from a base station 102 to the user device 108 results in a smaller minimum required time slot length $t_{PAL}|t_{PA}$, as well as a smaller time spreading period, $T_S$. Since the clock drift, $e_r(k)$, of the user device 108 within the reception time spreading period, $T_S$, can cause positioning error, said time spreading period is preferably minimized. Accordingly, in some embodiments, the transmission of the entire set of ephemeris information starting at $t_{PA}(k)|t_{PA}$ is to be avoided. In such embodiments, the minimum set of ephemeris information is transmitted, corresponding to the sequence number of the current ranging signal transmission. General purpose data communication may also occur at other times aside from the time occupied by the abovementioned ranging signal transmission. In one embodiment, any remaining ephemeris data set could be transmitted as one kind of the general purpose data. The remaining ephemeris information can also be broadcasted via a separate data link, in one embodiment.

In embodiments in which the data rate is high enough, transmission of the entire set of ephemeris information starting at $t_{PA}(k)|t_{PA}$ may be an acceptable option.

Base Station Clock Skew Adjustment

As discussed herein, the timing system (clock) of the control station 104A may be used as the common timing reference for UWB positioning system 100. However, the clocks of each base station 102 will inevitably drift from the control station 104A clock over time. As also discussed herein, to prevent collision of ranging signal transmission from multiple base stations 102, each base station 102 is assigned a unique slot during which the base station 102 may transmit a ranging signal. Over time, the transmission of ranging signals from a given base station 102 may no longer be guaranteed to occur during its assigned time slot due to the inevitable drift of the local time of said base station 102.

In some embodiments, the control station 102 may therefore be configured to determine whether the clock drift for a given base station 102 is below a predetermined error tolerance threshold. In one embodiment, the predetermined threshold may correspond to a predetermined percentage of the duration of the assigned time slot. For instance, in one such embodiment, a clock drift of a base station 102 that is well below the duration of the time slot assigned thereto may be acceptable.

In embodiments in which the control station 104A determines that the aforementioned threshold value has been reached or exceeded for a given base station 102, the control station 104A may send a clock adjustment command to the base station 102. The clock adjustment command may comprise instructions for adjusting the ranging signal transmission timing, and particularly the predetermined interval between ranging signal transmission, so subsequent transmissions of ranging signals will occur within the time slot assigned to the base station 102.

As an example of the means by which the timing of ranging signals may be updated, e.g., by the control station 104A, consider again base station 102A. Reorganizing Equation (3) as follows:

$$t_{PA}(k)|t_g = t_{gA}(k)|t_g - \tau_{gA}(k)|t_g \quad (3\text{-}1),$$

yields the transmission time of a ranging signal from base station 102A as measured in the local timing system, $t_g$, of the control station 104A. The modulo R operation of $t_{PA}(k)|t_{PA}$ yields Equation 12:

$$\delta_A|t_g = \lfloor t_{gA}(k)|t_g - \tau_{gA}(k)|t_g \rfloor_R \qquad (12),$$

with R again corresponding to the predetermined interval between transmitted ranging signals. The beginning/initial time of the time slot assigned to base station 102A is taken as time zero. The control station 104A is configured to maintain the base-station transmission time $\delta_A|t_g$ to the assigned, constant time slot $t_{PAL}|t_{PA}$. Accordingly, the control station 104A is configured to determine whether the value $\delta_A|t_g$ falls within the assigned time slot, $t_{PAL}|t_{PA}$, and does not reach or exceed the above predetermined error tolerance threshold. In response to determining that such is not the case, the control station 104A is configured to "steer" the transmission time of a subsequent ranging signal from base station 102A.

In one embodiment, the transmission time of a subsequent ranging signal from base station 102A may be altered ("steered") by adjusting the length of the subsequent interval R by $M_A$:

$$M_A = \lfloor t_{gA}(k)|t_g - \tau_{gA}(k)|t_g \rfloor_R - T_{PAL}|t_{PA} \qquad (13)$$

The $i^{th}$ occurrence of this "steering" of ranging signal transmission time is denoted by $M_A(i)$. Moreover, when the interval R is adjusted, the previous set of synchronization/ephemeris information is no longer valid. Consequently, each time the interval R is adjusted, a new set of synchronization/ephemeris information (e.g., $C_{gAi}$ coefficients, Equation (4-1)) is estimated/calculated.

In one embodiment, the control station 104A may deliver the steering value, $M_A(i)$, to the user device 108, and the user device 108 updates the synchronization/ephemeris information (e.g., $C_{gAi}$ coefficients). One disadvantage of this embodiment, is that the same computation needs to be carried out in each user device 108, where such user devices 108 typically have a tight power budget.

In another embodiment, the control station 104A may calculate/estimate the updated synchronization/ephemeris information (e.g., $C_{gAi}$ coefficients). If the delivery of this updated synchronization/ephemeris information to the user device 108 is through the data payload of the base station's 102A ranging signals, base station 102A will apply the updated synchronization/ephemeris from the first affected ranging signal transmission. If the updated synchronization/ephemeris information is directly delivered to the user device 108 through another data link, it may still be beneficial to save the computation power in the user device 108 and offload the associated tasks to the control station 104A.

The updated synchronization/ephemeris information may be modeled according to the function $f'(x)$ represented in Equation (14):

$$f'(x) = f[x + M_A(i)|t_{PA}] \qquad (14),$$

where x is:

$$x = [k - TOA(k)] \cdot R \,|\, t_{PA} + \sum_{j=0}^{i-1} M_A(j) \,|\, t_{PA}. \qquad (15)$$

Equation 15 comprises the interval R as measured in the local timing system, $t_{PA}$, which may drift. Equation 15 also comprises the total effect of all previous steering activity of the interval R.

Taking the second order as the adopted order for the ephemeris polynomial fitting, the expanded expression of ephemeris coefficients may be represented by Equation (16):

$$f(x + M_A|t_{PA}) = C_0 + C_1(x + M_A|t_{PA}) + C_2(X + M_A|t_{PA})^2$$
$$M_A|t_{PA} = (C_0 + C_1 M_A|t_{PA} + C_2 M_A^2|t_{PA} + M_A|t_{PA}) + (C_1 + 2C_2 M_A|t_{PA})x + C_2 x^2 \qquad (16).$$

Equation (16) provides the updated set of synchronization/ephemeris information to be used with, and after, the adjustment, $M_A$, of the interval R. According to Equation (4-1), measurements in the earlier epochs may be needed to synthesize the set of synchronization/ephemeris information. Once the adjustment, $M_A$, of the interval R is introduced, none of the existing historical data (e.g., associated with the synchronization/ephemeris information) will agree with the model described in Equation (4-1). Accordingly, the historical measurement data $f(x)$ can be re-formulated to be $f'(x)$ to reflect the adjustment $M_A$ as represented in Equation (17):

$$f'(x) = f(x) + C_1 M_A|t_{PA} + C_2 M_A^2|t_{PA} + M_A|t_{PA} + 2C_2 M_A|t_{PA} x \qquad (17).$$

RF Group Delay Calibration

The user device 108 may have a function that maps the relative orientation of a transmit/receive antenna pair to the antenna group delay compensation value. Such function may be implemented in the form of a look-up-table or in a more analytical form. When the user device 108 is equipped with attitude heading reference system (AHRS), the attitude information of the user device 108, together with the a priori knowledge of base station coordinate/antenna orientation, uniquely defines the relative orientation between the transmit/receive antenna pair. Consequently, the antenna group delay compensation value, $B_{rA}|t_r$, for the signal reception from each base station 102 becomes available as the output of the abovementioned mapping function. The term $B_{rA}|t_r$ in Equation (8) is no longer approximated to be a constant value $B_r|t_r$. This group delay compensation value removal further reduces the error in pseudorange measurement and positioning estimation error.

User Device Calibration

In one embodiment, the user device 108 may be calibrated as follows. By placing the user device 108 in a known location, the true value of the propagation delay $\tau_{gA}(k)|t_g$ in Equation (3-1) is known, thus enabling the calculation of the transmission time, $t_{PA}(k)|t_g$, of a ranging signal transmitted from base-station 102A from Equation (3-1). Again ignoring the difference of RF chain group delay in the user device 108, the observed transmission times of ranging signals transmitted from base stations 102A, 102B, . . . 102N may be represented by the vector:

$$[t_{PA}(k)|t_g t_{PB}(k)|t_g \cdot \cdot \cdot t_{PN}(k)|t_g] \qquad (18).$$

It is of note that a measurement of the propagation delay from a single base station 102 is meaningless, because the user device 108 is associated with the unknown term $\Delta T_{gr}$ (i.e., the instantaneous time difference between $t_r$ and $t_g$, see Equation (5)), which serves as a constant to be subtracted from Equation (18). If the measurement from one base station 102, e.g., base station 102A, is arbitrarily chosen as zero, the user device 108 pseudorange bias estimate for all other base stations 102 relative to base station 102A may be represented by:

$$[0\, t_{PB}(k)|t_g - t_{PA}(k)|t_g\, t_{PC}(k)|t_g - t_{PA}(k)|t_g \cdot \cdot \cdot t_{PN}(k) - t_{PA}(k)|t_g] \qquad (19).$$

User Device Position Determination

In some embodiments, at least four pseudorange measurements are needed to estimate the location of the user device 108, and the quality indicator associated therewith, the dilution of precision (DOP). In some embodiments, the pseudorange measurements may be directly used by the user device 108 for sensor data fusion with inertial or other sensor outputs, and/or the pseudorange measurements may be used directly to derive the position of the user device 108.

The location of the user device 108 may be determined iteratively, utilizing the matrix of Equation (20):

$$H = \begin{bmatrix} a_{x1} & a_{y1} & a_{z1} & 1 \\ a_{x2} & a_{y2} & a_{z2} & 1 \\ \vdots & \vdots & \vdots & \vdots \\ a_{xn} & a_{yn} & a_{zn} & 1 \end{bmatrix}, \quad (20)$$

where $(a_{xn}, a_{yn}, a_{zn})$ is a unity vector pointing from the current best knowledge of the user device 108 location to the $n^{th}$ base station 108 location. The state $\bar{x}$ represents the current best knowledge of the user device 108 location [x, y, z] and $T_{gr}$. It may be iteratively updated to approximate the true value using the following relationship:

$$\Delta \bar{x} = (H^T H)^{-1} H^T \Delta \vec{\rho} \quad (21).$$

In this iterative computation, $\Delta \bar{x} = [\Delta x, \Delta y, \Delta z, \Delta T_{gr}]^T$ is the update to the previous value of $[x, y, z, T_{gr}]$ in each iteration.

In some embodiments, the positioning result in Equation (21) or the raw pseudorange measurements may be used in sensor fusion algorithm for improved accuracy and availability.

B. User Device—Transmission Mode

In embodiments in which the user device 108 operates in "transmission mode," the user device 108 is configured to send ranging signals to the base stations 102. One advantage of the user device 108 operating in transmission mode is that the user device 108 doesn't need to know its location, (the location of the user device 108 will be estimated by the server side).

Calculation of the pseudorange between a base station 102 and the user device 108 may still proceed according to Equation (9), with the difference being that the role of transmission and reception for the base station 102 and user device 108 is reversed.

Synchronization of the base stations 102 in embodiments where the user device 108 operates in transmission mode may be achieved utilizing various approaches. In one embodiment, the control station 104A may repeatedly transmit a synchronization signal to each base station 102, where estimation of synchronization/ephemeris information (e.g., $C_{gAi}$ coefficients) proceeds according to Equation (4-1). In another embodiment, all base stations 102 may be driven by the same clock distribution network, where all the base station 102 time coordinates are coherent. The clock bias for each base station 102 may be also be determined by Equation (4-1).

In some embodiments, in response to collecting a pseudorange measurement from at least four base stations 102, the control station 104A may generate the location estimate of the user device 108 as described in Equation (21).

C. UWB Positioning System Architecture

Figure 2:
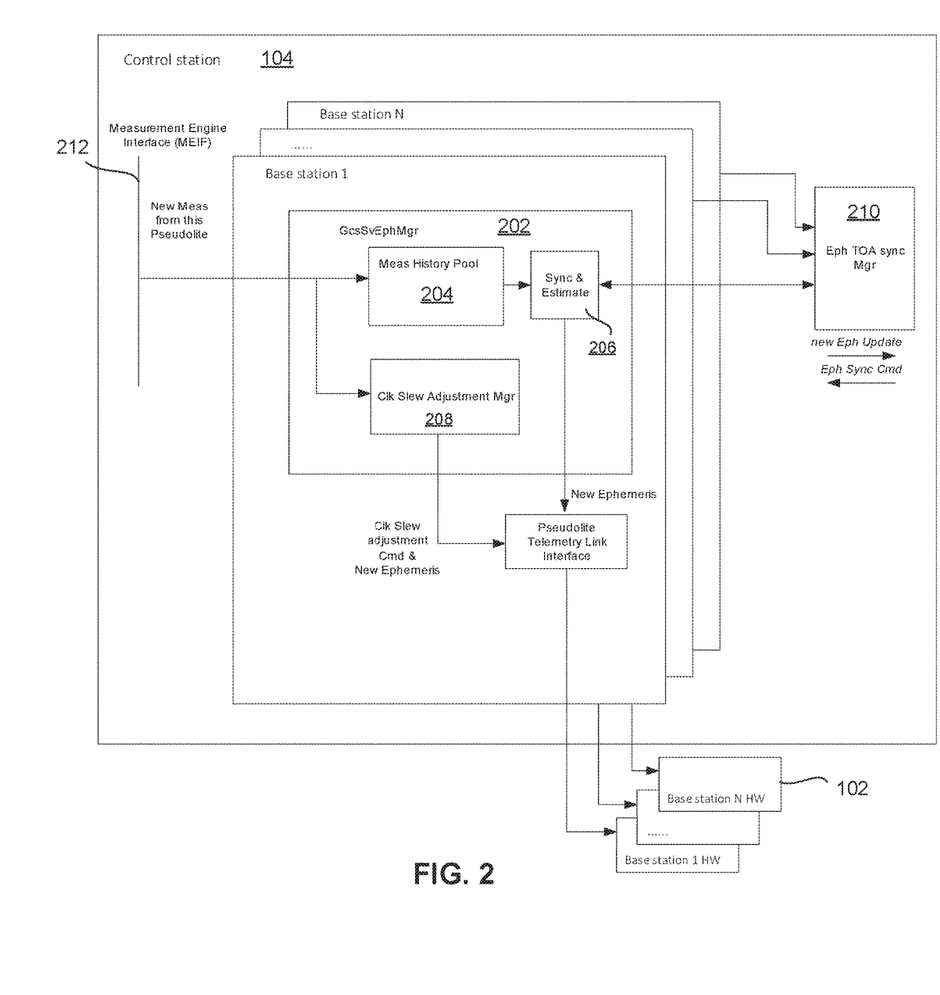
FIG. 2 depicts a simplified signal processing schematic of a control station processing the monitoring data received from one or more base stations as described in the UWB positioning system of FIG. 1, according to one embodiment.

FIG. 2 depicts a simplified schematic diagram of the one or more base stations 102 and a control station 104 of the UWB positioning system 100 of FIG. 1, according to one exemplary embodiment. The control station 104 may include one or more processors and memory. The processor(s) of the control system 104 may be configured to perform various operations by interpreting machine-readable instructions stored in the memory. The control station 104 may also comprise one or more modules and/or other instructions that enable the control station 104 to perform various operations, as described herein. The various modules may be described as performing an operation for convenience, yet it should be noted that the instructions program the processor(s) of the control station 104 to perform said operations.

As shown in FIG. 2, the control station 104 may comprise an ephemeris manager module 202 configured to control the timing of the ranging signals transmitted from the base stations 102 operatively coupled thereto. To that end, the ephemeris manager module 202 may comprise a "measurement history pool" module 204 configured to store information (e.g., timing information) associated with the ranging signals received from each base station. The ephemeris manager module 202 may also comprise a "sync & estimate" module 206 configured to determine the synchronization/ephemeris information (e.g., the $C_{gAi}$ coefficients) associated with each base station 102, so as to effectively synchronize the base stations 102 to a common timing reference (e.g., the timing system of the control station 104). The ephemeris manager module 202 may additionally comprise a "clock skew adjustment manager" module 208 configured to ensure that the transmission of ranging signals from each base station 102 occurs during the unique time slots assigned thereto, and to update the synchronization/ephemeris information for one or more base stations 102 if necessary. The control station 104 may further comprises a "ephemeris time-of-arrival sync manager" module 210 for determining the arrival time of the ranging signals transmitted from the base stations 102.

As also shown in FIG. 2, the control station 104 may include one or more communication interfaces 212 configured to have the physical communication with the base stations 102 and produce the signal reception timestamp measurement operatively coupled thereto (e.g., via the transmission and receipt of signals). Additional communication interfaces (not shown in FIG. 2) may also be present within the control station 104 to allow communication, e.g., with a user device 108. While also not shown in FIG. 2, the control station 104 may include one or more interfaces for connecting peripheral devices, such as a display, touch screen, keyboard, etc.

While not shown in FIG. 2, each of the base stations 102 operatively coupled to the control station 104 may comprise one or more processors and memory. The processor(s) of each base station 102 may be configured to perform various operations, such as those discussed herein, by interpreting machine-readable instructions stored in the memory.

Moreover, while also not shown in FIG. 2, the control station 104 and/or the base stations 102 may each comprise one or more antennas for the communication of ranging signals (e.g., UWB signals) therebetween.

Figure 3:
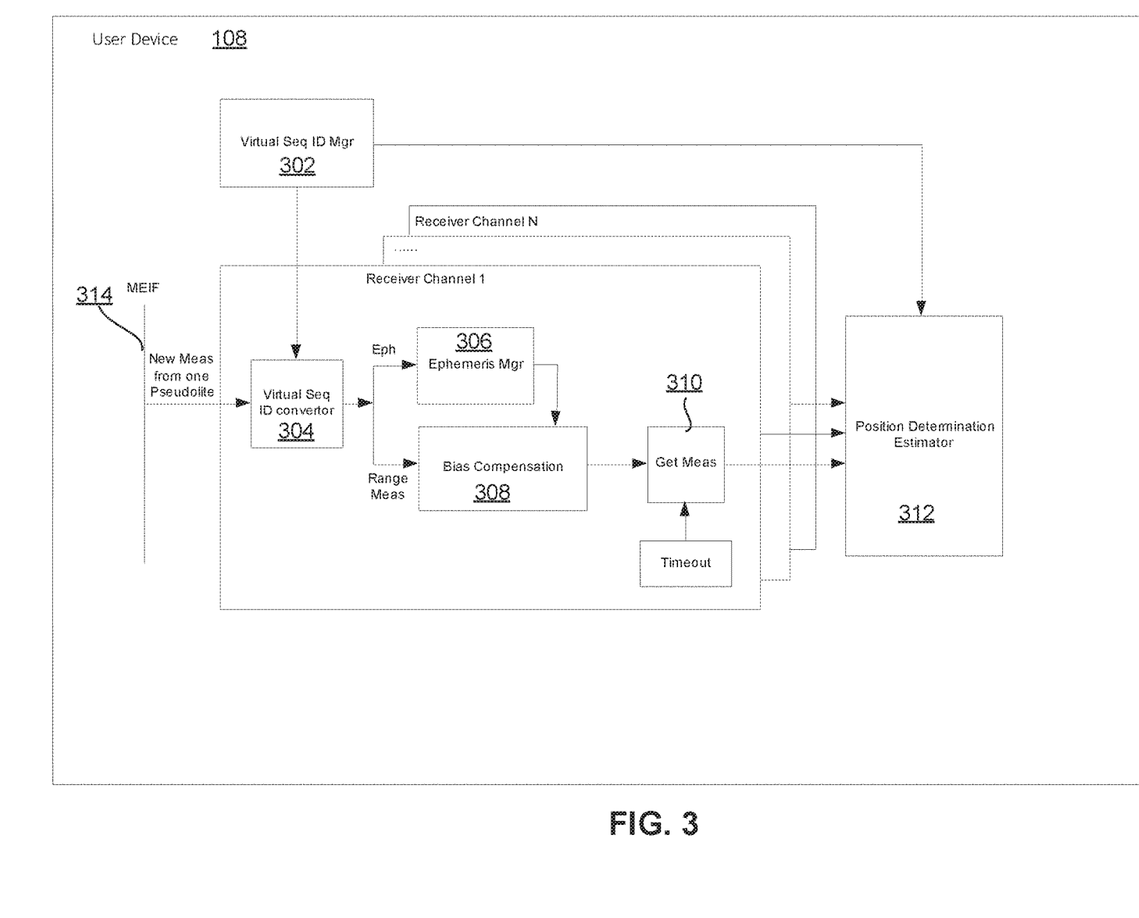
FIG. 3 depicts a simplified signal processing schematic of a user device as described in the UWB positioning system of FIG. 1, according to one embodiment.

FIG. 3 depicts a simplified schematic diagram of a user device 108 of the UWB positioning system 100 of FIG. 1, according to one exemplary embodiment. The user device 108 may be a personal computer (e.g., a desktop computer, a laptop computer, etc.), a smartphone, a tablet computing device, an embedded system device, and/or other computing device as would be understood by skilled artisans upon reading the present disclosure.

The user device 108 may include one or more processors and memory. The processor(s) of the user device 108 may be configured to perform various operations by interpreting machine-readable instructions stored in the memory. The user device 108 may also comprise one or more modules and/or other instructions that enable the user device 108 perform various operations, as described herein. The various modules may be described as performing an operation for convenience, yet it should be noted that the instructions program the processor(s) of the user device 108 to perform said operations.

As shown in FIG. 3, the user device 108 may include a "virtual sequence ID manager: module 302, and for each receiver channel, a "virtual sequence ID converter" module 304, an "ephemeris manager" module 306 associated with the management/collection of the synchronization/ephemeris information associated with received ranging signals from the base stations 102, a "bias compensation module" 308 which compensates all bias terms in pseudorange measurements, a "measurement" module 310 for determining pseudoranges between respective base stations 102 and the user device 108, and a "position determination estimator" 312 for determining the position of the user device (e.g., based on at least four pseudorange calculations).

As also shown in FIG. 3, the user device 104 may include one or more communication interfaces 314 configured to have the physical communication with the base stations 102 and/or the control station 104 and produce the signal reception timestamp measurement operatively coupled thereto (e.g., via the transmission and receipt of signals).

D. Exemplary Methods of Using the UWB Positioning System

Figure 4:
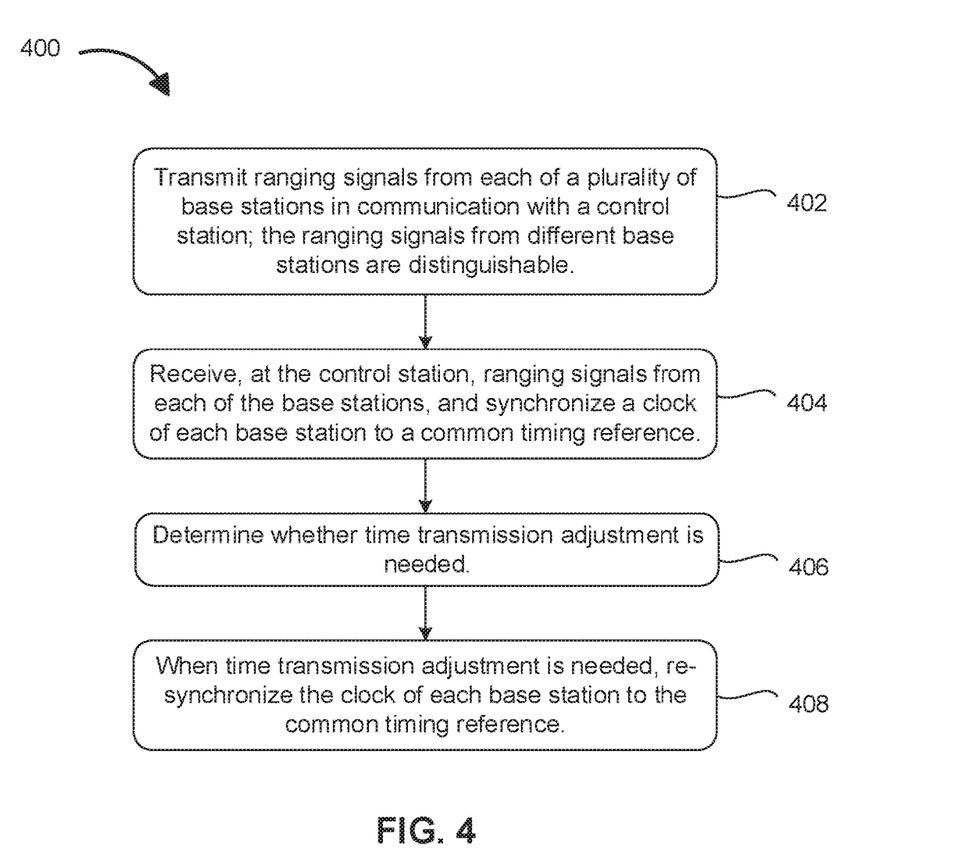
FIG. 4 is a block diagram that illustrates a process of one embodiment of the present disclosure.

FIG. 4 depicts an exemplary method 400 for efficient signal communication, according to one embodiment. The method 400 may be implemented in conjunction with any of the devices/features/components described herein, such as those described with reference to other embodiments and FIGS. The method 400 may also be used for various applications and/or according to various permutations, which may or may not be noted in the illustrative embodiments/aspects described herein. For instance, the method 400 may include more or less operations/steps than those shown in FIG. 4, in some embodiments.

As shown in FIG. 4, the method 400 comprises transmitting ranging signals from each of a plurality of base stations that are in electronic communication with a control station. See operation 402. In some embodiments, each of the base stations may be disposed at a location of each base station in the given space/area is known, or may be determined by a global positioning system (GPS), local survey data, computer vision based locationing, etc. Similarly, the location of the control station may be known or determined by implementing any of the aforementioned positioning techniques.

Further, each of the plurality of base stations may be configured to transmit ranging signals such that (a) a user device disposed in the given space/area is able to receive the ranging signals of at least one of the base stations one at a time and is able to determine a location of the user device based on the received ranging signals, and (b) if ranging signals from more than one base station are received by the user device, no signal collision occurs. To that end, ranging signals from different base stations may be distinguishable from one another in terms of one or more characteristics. See operation 402. In some embodiments, these one or more characteristics may include the signal transmission timing and/or a signal strength (e.g., signal to noise ratio), as discussed below.

For instance, in some embodiments ranging signals from different base stations may be distinguishable from one another based, at least in part, on signal transmission time. In such embodiments, each base station may be assigned a unique/different slot during which the base station is allowed to transmit a ranging signal, thereby avoiding signal collision in instances where a device (e.g., a user device) in the given space/area receives ranging signals from the plurality of bases stations.

In some embodiments, ranging signals from different base stations may be distinguishable from one another based, at least in part, on signal strength. In such embodiments, a base station may share the same time slot as another base station in the given space/area when the two base stations are separated a sufficient distance apart. Signal collision may also be avoided due to the difference in the signal strength (e.g., signal to noise ratio) for the ranging signals transmitted from these two base stations. For instance, while a user device in the given space/area may receive ranging signals from the two base stations at the same time, the distance between the two base stations may be large enough such that the user device only receives ranging signals from one of the two base stations at a usable level (e.g., with a usable signal to noise ratio).

As discussed previously, each base station may run according to its own local clock. As the local clocks of each base station may drift from one another over time. Accordingly, the method 400 additionally comprises receiving, at the control station, ranging signals from each of the base stations, and synchronizing a clock of each base station to a common timing reference, such as to the clock of the control unit. See operation 404. For each of the one or more base station, this synchronization process may involve: calculating a clock bias model of the base station relative to the common timing reference based on information encoded in the received ranging signal(s); and providing/communicating the calculated clock bias as ephemeris information to the base station. This ephemeris information may then be included in the data payload of ranging signals transmitted after said synchronization process.

In some embodiments, the clock of one or more of the base stations may drift from that of the common timing reference over time. The control unit, which may continually receive ranging signals from the base stations, may therefor determine whether a transmission time adjustment is needed. See operation 406. Determining whether a transmission time adjustment is needed may involve determining whether the ranging signal transmission time of each base station is occurring during the time slot assigned thereto within a certain tolerance level as measured in the time coordinate system of the common timing reference (e.g., the time coordinate system of the control unit). Transmission time adjustment may be needed for a base station where said base station does not transmit a ranging signal during its assigned time slot within the aforementioned tolerance level.

Whenever a transmission time adjustment is needed, the method 400 further comprising re-synchronizing the clock of each base station to the common timing reference. See operation 408. In particular, the control unit may re-generate the clock bias model of the respective base stations to the common timing reference. This re-synchronization process may involve: re-calculating the clock bias of the base station relative to the common timing reference based on the reception time measurement and the adjustment; and providing/communicating the re-calculated clock bias model as updated synchronization information to the base station. This updated synchronization information may then be included in the data payload of ranging signals transmitted after said re-synchronization process.

As noted above, each base station is configured to transmit a ranging signal during an assigned time slot, and transmission of the ranging signal is repeated according to a predetermined interval. In some embodiments, the control unit may ensure that ranging signal communication from the base stations is efficient and without signal transmission collision by adjusting the transmission timing of the ranging signals when needed. For instance, in one embodiment, the control unit may be configured to send a command to at least one of the base stations to adjust the predetermined interval between ranging signals to ensure that transmission of each ranging signal occurs during the time slot assigned to that base station.

Figure 5:
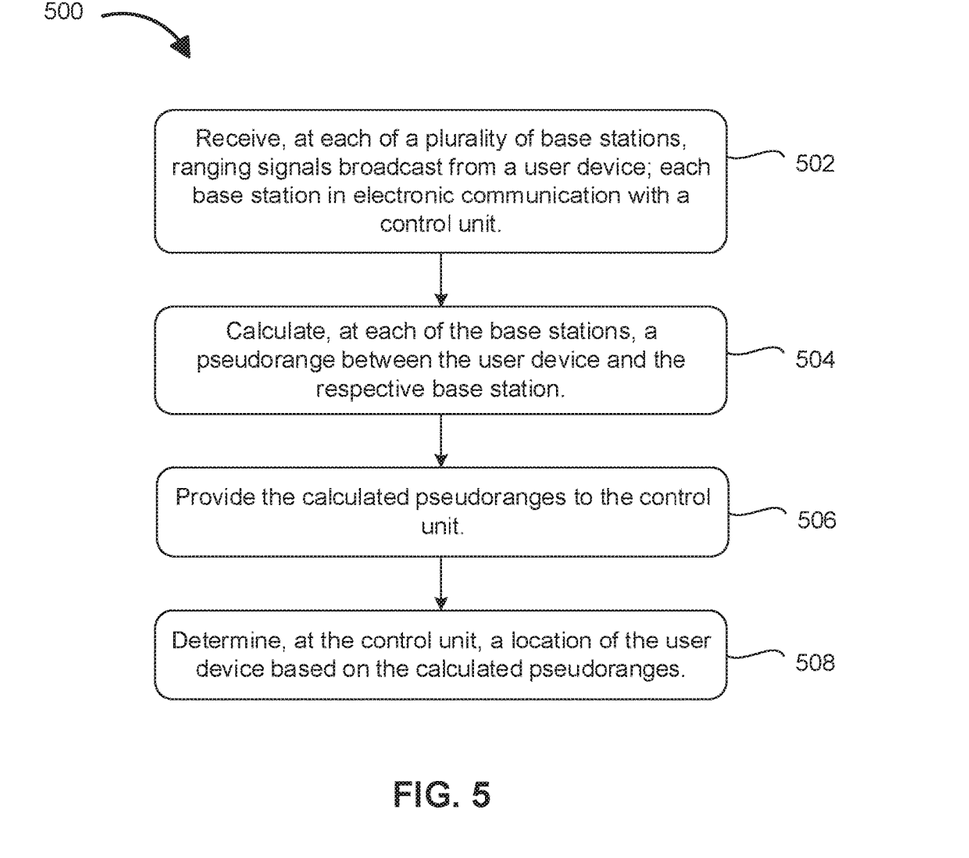
FIG. 5 is a block diagram that illustrates a process of another embodiment of the present disclosure.

FIG. 4 describes an exemplary method 400 for efficient signal communication in which the base stations primarily operate in broadcast mode. FIG. 5 describes an exemplary method 500 for efficient signal communication in which the base stations primarily operate in receiver mode.

As shown in FIG. 5, the method 500 comprises receiving at each of a plurality of base stations, ranging signals transmitted from a user device, where each base station is in electronic communication with a control unit. See operation 502. The user device may be disposed at a location in a given space/area, where such location is not yet known, but rather to-be-determined via method 500. Conversely, each base station may be disposed at a location in the given space/area, where such location is known or able to be determined using any of the positioning techniques described herein.

The method 500 may further comprise calculating, at each of the base stations, a pseudorange between the user device and the base station based on the received ranging signals, and providing the calculated pseudorange to the control unit. See operations 504 and 506, respectively.

The method 500 may additionally comprises determining, at the control unit, the location of the user device in the given space/area based, at least in part, on the calculated pseudoranges. See operation 508.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system, comprising:
    a control station; and
    a plurality of base stations, each of the base stations being disposed at a location of a space and in electronic communication with the control station,
    wherein each of the base stations is configured to broadcast ranging signals such that (a) a user device in the space is able to receive the ranging signals of at least one of the base stations one at a time and is able to determine a location of the user device based on the received ranging signals, and (b) if ranging signals from more than one base station are received by the user device, no signal collision occurs; and
    wherein the control station is configured to receive one or more of the ranging signals from each of the base stations and, in response to determining that time synchronization is needed for one or more of the base stations, provide synchronization information to the one or more base stations to synchronize a clock thereof to a common timing reference.

2. The system of claim 1, wherein the synchronization information provided to each of the one or more base stations comprises clock bias model information of the base station relative to the common timing reference.

3. The system of claim 2, wherein the ranging signals transmitted from the one or more base stations, after synchronization thereof to the common timing reference, comprise the synchronization information provided by the control station.

4. The system of claim 1, wherein the control station is further configured to determine whether another time synchronization is needed for any of the base stations.

5. The system of claim 4, wherein the control station, in response to determining that another time synchronization is needed for one or more of the base stations, is further configured to provide updated synchronization information to the one or more base stations to re-synchronize a clock thereof to the common timing reference.

6. The system of claim 5, wherein the updated synchronization information provided to each of the one or more base stations comprises an updated clock bias of the base station relative to the common timing reference.

7. The system of claim 6, wherein the ranging signals transmitted from the one or more base stations, after re-synchronization thereof to the common timing reference, comprise the updated synchronization information provided by the control station.

8. The system of claim 1, wherein the common timing reference corresponds to a clock of the control station.

9. The system of claim 1, wherein each of the base stations is configured to broadcast the ranging signals during a predetermined slot.

10. The system of claim 9, wherein the predetermined slot for each of the base stations corresponds to a predetermined ranging signal transmission time, or a predetermined ranging signal frequency, or a predetermined ranging signal modulation scheme.

11. The system of claim 10, wherein the predetermined slot for each of the base stations is unique.

12. The system of claim 10, wherein at least two base stations share the same predetermined slot provided the at least two base stations are a predetermined distance apart.

13. The system of claim 9, wherein each of the base stations is configured to broadcast the ranging signals according to a predetermined interval.

14. The system of claim 13, wherein the control station is further configured to send a command to each of the base stations to adjust the predetermined interval between ranging signals so as to maintain transmission of the ranging signals during the predetermined time slot.

15. The system of claim 1, wherein the user device is configured to operate in an active receiving mode or a standby mode.

16. The system of claim 15, wherein the active receiving mode is a mode in which the user device is able to receive ranging signals from at least one of the base stations.

17. The system of claim 1, further comprising one or more additional control stations in electronic communication with the base stations to expand a network size of the system.

18. A system, comprising:
a control station; and
a plurality of base stations, each base station being disposed at a location of a space and in electronic communication with the control station,
wherein each of the base stations is configured to receive ranging signals from a user device in the space, and calculate a pseudorange between the user device and the base station based on the received ranging signals; and
wherein the control station is configured to receive the calculated pseudoranges from the plurality of base stations, transmit a synchronization signal to each of the base stations, and determine a location of the user device in the space based on the calculated pseudoranges.

19. The system of claim 18, wherein the control station is configured to determine the location of a user device in the space based on at least four calculated pseudoranges.

20. The system of claim 18, where each of the plurality of base stations is synchronized to a clock of the control station.

21. The system of claim 18, wherein the calculated pseudoranges do not include an antenna group delay bias.

22. A system, comprising:
a control station; and
a plurality of base stations, each base station being disposed at a location of a space and in electronic communication with the control station,
wherein each of the base stations is configured to receive ranging signals from a user device in the space, and calculate a pseudorange between the user device and the base station based on the received ranging signals;
wherein the control station is configured to receive the calculated pseudoranges from the plurality of base stations, and determine a location of the user device in the space based on the calculated pseudoranges; and
wherein the calculated pseudoranges do not include an antenna group delay bias which is removed from the calculated pseudoranges based, at least in part, on a known relative orientation of transmit and receive antennas associated with the user device and base stations.

* * * * *